E. R. SIMMS.
VEHICLE TIRE.
APPLICATION FILED JUNE 11, 1918.

1,336,790.  Patented Apr. 13, 1920.

Inventor
Edward R. Simms,
By
G. Hume Talbert
Attorney

UNITED STATES PATENT OFFICE.

EDWARD R. SIMMS, OF SCOTTDALE, PENNSYLVANIA.

VEHICLE-TIRE.

1,336,790.   Specification of Letters Patent.   Patented Apr. 13, 1920.

Application filed June 11, 1918. Serial No. 239,419.

*To all whom it may concern:*

Be it known that I, EDWARD R. SIMMS, a citizen of the United States of America, residing at Scottdale, in the county of Westmoreland and State of Pennsylvania, have invented new and useful Improvements in a Vehicle-Tire, of which the following is a specification.

The principal purpose of the invention is to provide a vehicle tire having all the advantages of a pneumatic tire with none of its disadvantages.

A further purpose of the invention is the provision of a tire of this character in which the tread portion is separable from the remainder of the tire.

Other and further purposes of the invention appear hereinafter.

To the exact form in which it is shown and described the invention is not to be restricted. The right is reserved to make such changes or alterations as the actual reduction to practice may demand in so far as such changes or alterations are comprehended in spirit by the annexed claim.

Figure 1:
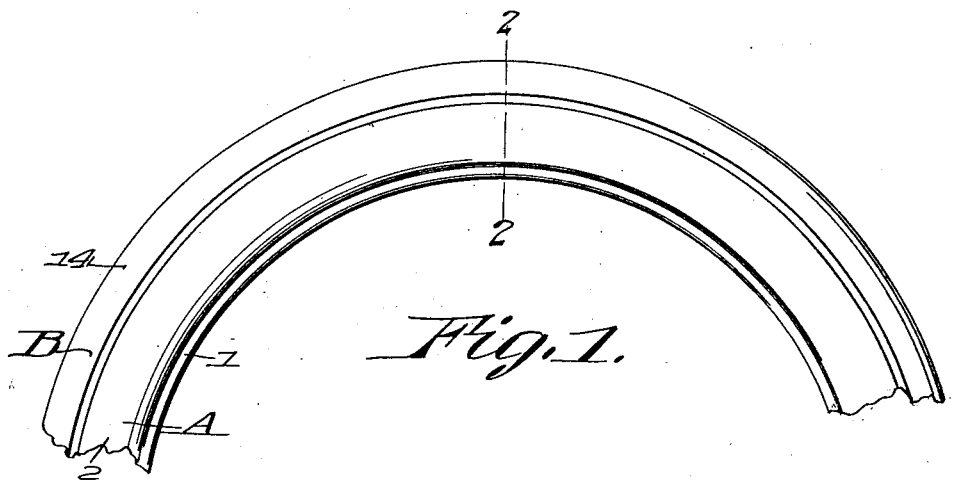
Figure 1 is a view in elevation showing a segment of the improved tire.
Figure 2:
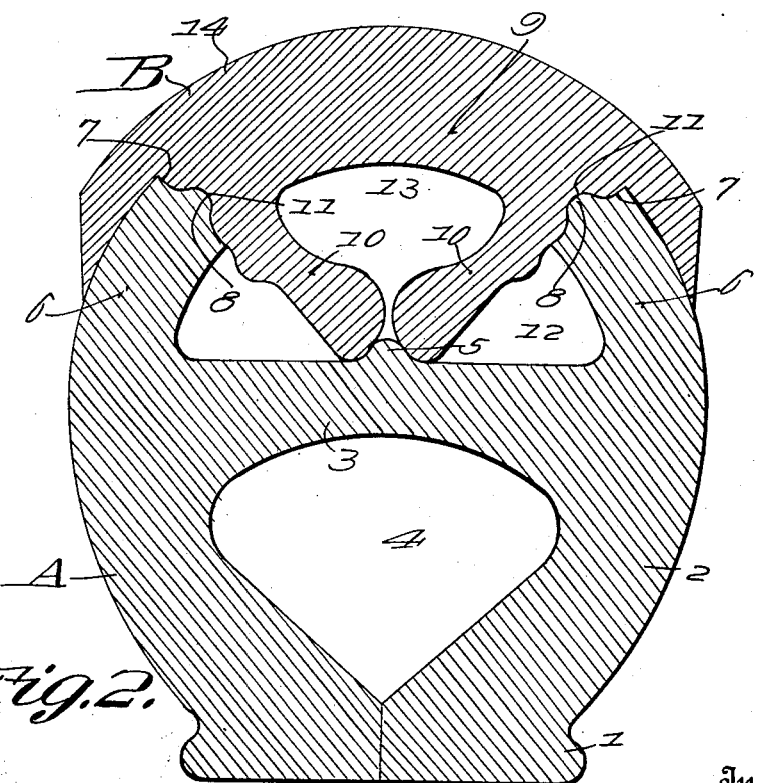
Fig. 2 is a transverse sectional view of the structure of Fig. 1.

Referring to the drawings, the tire is shown as comprising the body section A and the tread section B. The body section A is formed with the rim engaging beads 1, formed integral with the side walls 2, which are relatively thick as compared to the thickness of the usual outer casing of a tire. The two side walls 2 are interconnected by a web 3 and this web and the two side walls surround an interior air space 4.

On its outer face the web is formed with the annular rib 5 and the two outer walls 2 are extended beyond the web to form the projections 6 on the edges 7 of which there are formed the beads 8.

The tread portion B comprises the body wall 9 and the inturned diagonally disposed annular bracing members 10. The body wall 9 on its edges is provided with the annular recesses 11 in which the beads 8 are designed to engage and the ends of the bracing members 10 abut the rib 5 on opposite sides. Air spaces 12 are provided between the bracing members 10, the projections 6 and the web 3 and a further air space 13 is comprehended between the outer wall 9 and the bracing members 10. A tread member 14 forms an integral part of the body wall 9 of the tread section B and this tread member is extended laterally beyond either edge of the wall 9, so that the extensions thus provided may lie against the sides of the projections 6.

Since the tire is not designed to receive air under pressure, its resiliency is provided by the bracing members 10, the web 3 and the side walls 2. The extension of the tread member 14 to either side of the body wall 9 serves to prevent the admission of dust or dirt in between the two sections of the tire. It also partly serves to throw the weight of the vehicle on which it is used on the side walls 2 of the section A, thus relieving the web 3 of the whole strain.

From the foregoing description and drawings, it is thought that the construction of the invention will be readily appreciated and further description is, therefore, omitted.

The invention having been described, what is new and useful is:

A tire of the kind described comprising a body section formed with relatively thick side walls having rim engaging beads, with a web interconnecting the side walls, with a centrally disposed rib on the web, and with extensions beyond the web having beads formed on their edges; a tread section formed with a body wall having recesses formed on its edges with which the beads on the said extensions engage, and with bracing members inturned and diagonally disposed from its edges and bearing upon the rib of the aforesaid web, and with a tread member formed with the body wall of the tread section and overlapping the extensions on the body section.

In testimony whereof I affix my signature.

EDWARD R. SIMMS.